(12) United States Patent
Negre

(10) Patent No.: US 9,081,101 B2
(45) Date of Patent: Jul. 14, 2015

(54) SENSITIVE CHARGE FOR PASSIVE DOSIMETRY, DOSIMETER COMPRISING SUCH A SENSITIVE CHARGE AND SYSTEM FOR READING BY ILLUMINATION FOR SUCH A SENSITIVE CHARGE

(75) Inventor: Jean-Paul Negre, Bonnelles (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 70 days.

(21) Appl. No.: 13/982,363

(22) PCT Filed: Jan. 30, 2012

(86) PCT No.: PCT/FR2012/050193
§ 371 (c)(1),
(2), (4) Date: Jul. 29, 2013

(87) PCT Pub. No.: WO2012/104533
PCT Pub. Date: Aug. 9, 2012

(65) Prior Publication Data
US 2013/0306881 A1    Nov. 21, 2013

(30) Foreign Application Priority Data
Feb. 2, 2011 (FR) .................................. 11 50816

(51) Int. Cl.
*G01T 1/04* (2006.01)
*G01T 1/10* (2006.01)
*G01T 1/105* (2006.01)

(52) U.S. Cl.
CPC .. *G01T 1/10* (2013.01); *G01T 1/105* (2013.01)

(58) Field of Classification Search
CPC .......... G01T 1/10; G01T 1/2012; G01T 1/105
USPC ................................. 250/473.1, 486.1, 484.5
See application file for complete search history.

(56) References Cited

U.S. PATENT DOCUMENTS 2,689,307 A    9/1954  Fairbank
2,747,103 A    5/1956  Fairbank et al.
(Continued)

FOREIGN PATENT DOCUMENTS

DE              1029947 B        5/1958
EP              0 499 350 A2     8/1992
WO    WO 2009/030833 A1    3/2009
WO    WO 2010/132569 A2   11/2010

OTHER PUBLICATIONS

Abraham, I. et al., "Measurements in shock physics: R&D in flash radiography," Chocs Journal, No. 38, CEA-DAM, 2010, pp. 18-28 (with English abstract).
(Continued)

*Primary Examiner* — David Porta
*Assistant Examiner* — Meenakshi Sahu
(74) *Attorney, Agent, or Firm* — Brinks Gilson & Lione

(57) ABSTRACT

Sensitive charge for passive dosimeter includes a plurality of flexible photostimulable screens designed to be stacked inside a dosimeter casing and each having a radiosensitive layer of radiophotoluminescent material which can therefore be read differentially by illumination. The screens being integral with a foldable support having two configurations, namely a folded detection configuration, in which the screens are stacked on one another, and an unfolded reading configuration, in which the screens are arranged alongside one another on the same face of the support. Intercalated sheets with reinforcing/absorbing effect can also be fixed to the support, alternating with the screens, the screens being separated from the adjacent screens by two folds and the sheets are separated from the adjacent sheets by two folds.

15 Claims, 3 Drawing Sheets

(56) References Cited

U.S. PATENT DOCUMENTS

| | | | |
|---|---|---|---|
| 3,582,653 A | | 6/1971 | Howard |
| 4,513,078 A | * | 4/1985 | Sandrik et al. ............... 430/496 |
| 5,083,031 A | | 1/1992 | Hoelsher et al. |
| 5,549,843 A | * | 8/1996 | Smith et al. ............ 252/301.4 H |
| 5,731,589 A | | 3/1998 | Sief et al. |
| 6,198,108 B1 | * | 3/2001 | Schweitzer et al. ....... 250/472.1 |
| 7,420,187 B1 | | 9/2008 | Klemic et al. |
| 2012/0068084 A1 | * | 3/2012 | Li .............................. 250/473.1 |

OTHER PUBLICATIONS

Baker, Colin R. et al., "Reconstruction of 6 MV photon spectra from measured transmission including maximum energy estimation," Phys. Med. Biol., vol. 42, 1997, pp. 2041-2051.

Manciu, Marian et al., "Robust megavoltage x-ray spectra estimation from transmission measurements," Journal of X-Ray Science and Technology, vol. 17, 2009, pp. 85-99.

Olch, Arthur J., "Evaluation of a computed radiography system for megavoltage photon beam dosimetry," Med. Phys., vol. 32(9), Sep. 2005, pp. 2987-2999.

Sauer, Otto et al., "Reconstruction of high-energy bremsstrahlung spectra by numerical analysis of depth-dose data," Radiotherapy and Oncology, vol. 18, 1990, pp. 39-47.

Shaw, Chris C. et al., "Improvement of signal-to-noise and contrast-to-noise ratios in dual screen computed radiotherapy," Med. Phys., vol. 24(8), Aug. 1997, pp. 1293-1302.

International Search Report for International Application No. PCT/FR2012/050193, dated Oct. 8, 2012, 3 pages.

* cited by examiner

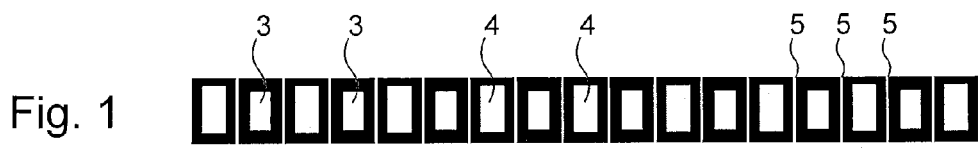
Fig. 1
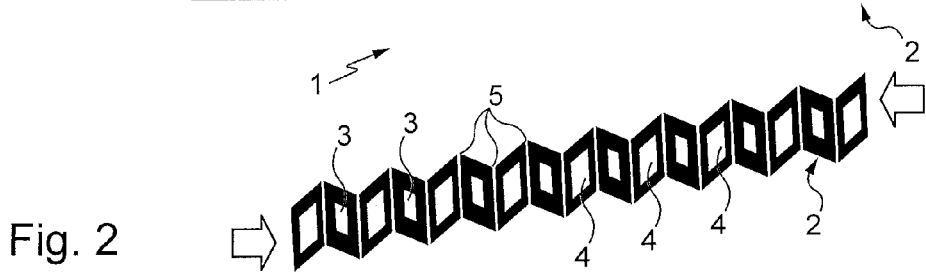
Fig. 2
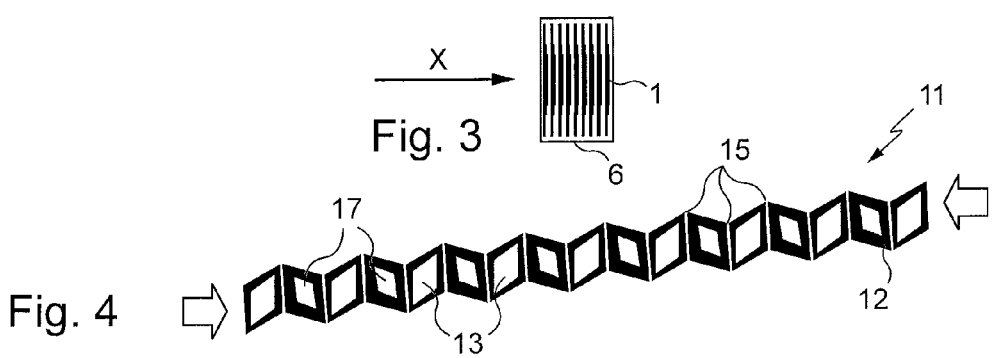
Fig. 3
Fig. 4
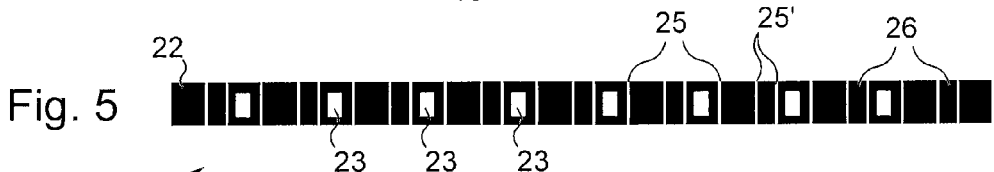
Fig. 5
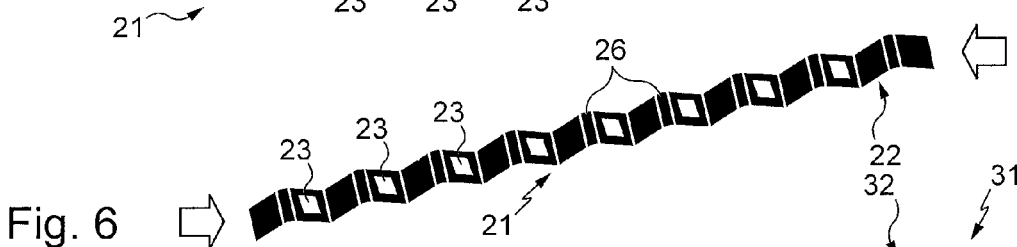
Fig. 6
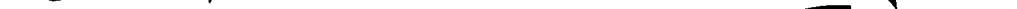
Fig. 7
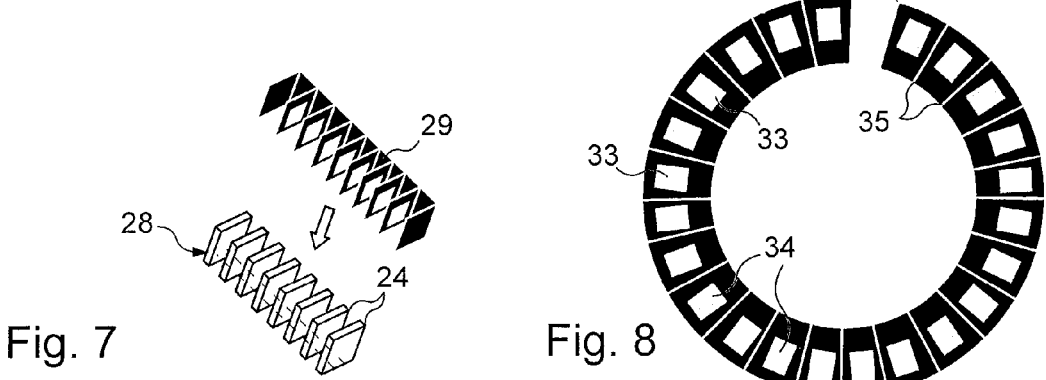
Fig. 8
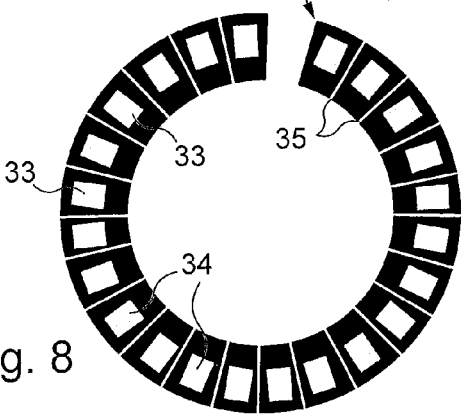

SENSITIVE CHARGE FOR PASSIVE DOSIMETRY, DOSIMETER COMPRISING SUCH A SENSITIVE CHARGE AND SYSTEM FOR READING BY ILLUMINATION FOR SUCH A SENSITIVE CHARGE

TECHNICAL FIELD

The invention concerns a passive dosimeter sensitive charge, a passive dosimeter comprising such a sensitive charge and a reader adapted to read such a sensitive charge.

It is in particular directed to the quantification of radiation of different kinds (X, gamma, neutrons, protons, electrons, etc.) in environmental checks, the radioprotection of persons, the characterization of ionizing radiation emitting apparatuses (radioactive sources, nuclear reactors, X-ray generators, particle accelerators, etc.), in radiodiagnosis or in radiotherapy, as well as in the checking of any other technique employing ionizing radiation.

It is to be noted that, for ionizing radiation, two units of measurement are mainly used, namely the Gray (abbreviated to Gy) which designates "absorbed dose" (that is to say the energy absorbed by a unit of mass of the target material), and the Sievert (Sv) which designates the corresponding "effective dose" (it may be stated that the effective dose corresponds to the effects of a given absorbed dose, according to the nature of the radiation and the nature of the target material).

In fact, use is also made of the concept of Kerma (standing for "Kinetic Energy Released per unit Mass", or even "Kinetic Energy Released in Matter") which represents the quantity of energy transferred to a unit mass of matter by an ionizing radiation (for example the energy transferred, per unit mass, by incident photons to secondary electrons to which movement has been imparted by those photons). The Kerma is also measured in Gray.

It may easily be understood that the passive character of a dosimeter enables the structure thereof to be simplified, since it therefore only contains passive components, in particular as regards its sensitive charge; as to the concept of deferred reading, this means that collection of the effects of radiation on the dosimeter sensitive charge is deferred.

BACKGROUND

An old technique of passive dosimetry with deferred reading utilizes a sensitive charge comprising silver-based films (that is to say photographic emulsions) onto which are sometimes applied absorbent sheets of paper, plastics material or metal; this sometimes referred to as "dosifilm". Their implementation is demanding and complex, while being single-use, whereas their response depends on numerous parameters. These films have a detection threshold of at least 0.3 mGy and can measure doses up to 20 Gy. These films do not therefore meet the current needs relating to individual dosimetry, since (in France) the order of Dec. 31, 2004 has set the detection threshold at 0.1 mSv (or 0.1 mGy of X and gamma radiation).

Another technique, which appeared in the 1950's, employs a dosimeter with a thermoluminescent sensitive charge, i.e. a thermoluminescent dosimeter (abbreviated to TLD) using lithium fluoride doped with magnesium (denoted LiF:Mg, and more commonly called "FLi"), alumina, calcium fluoride activated with manganese ($F_2Ca(Mn)$, in particular commercialized under the name TLD400), lithium boride (in particular commercialized under the name TLD800), natural fluorite, etc. Reading the TLD is possible only once, but it is re-usable; it is able to measure cumulative doses comprised between 10 µGy and several Gy. U.S. Pat. No. 5,083,031 describes a personal thermoluminescent dosimeter using the principle of absorbent filters to discriminate the nature of the incident ionizing radiation. U.S. Pat. No. 3,582,653 describes an X-ray spectrometer based on alternating capsules of FLi and filter screens which measure quantities proportional to the dose absorbed behind the screens and deduces the spectrum of the incident radiation therefrom by mathematical manipulation.

Another technique employs dosimeters with a radio-photoluminescent sensitive charge, in particular a radio-photoluminescent dosimeter (abbreviated to RPL) which are differentiated from TLDs by the fact that they use certain categories of doped glass, and that the radiative recombination of the electrons trapped in the defect centers, called color centers, is induced by photo-stimulation in the UV range, in practice by laser (as of the 1980's). Dosimeters of this type, provided by the IRSN (standing for Institut de Radioprotection et de Sûreté Nucléaire in French, or Nuclear Safety and Radioprotection Institute in English) use glass doped with a silver-based compound, and comprising three superposed layers of glass and filters (of plastic and metal), which provides 15 measurement ranges in analytical reading (5 in routine use) and to provide an indication as to the nature of the energy of the ionizing reduction concerned (from 10 keV to 10 MeV, for photons). Reading is non-destructive, which enables several readings of the same sensitive charge irradiated by a given dose, or intermediate measurements over long periods of exposure to the radiation at issue. In practice, the minimum sensitivity threshold is 20 µGy and the dose measured may be up to 10 Gy.

Another technique employs dosimeter with optically stimulated luminescence (or OSL in abbreviation), which appeared at the end of the 1990's, of which the active component of the sensitive charge belongs to the family of radio-photoluminescent materials; in practice this is carbon doped alumina ($Al_2O_3$:C). Under radiation, the electrons are trapped in the crystal defect centers formed by the carbon atoms. At ambient temperature, the charges may remain trapped for several days; deferred reading of the cumulative energy is carried out by photostimulation by means of a flash emitting green light, the intensity of the characteristic blue light peak being proportional to the cumulative energy. This dosimeter may be re-used after resetting, by heating or by optical illumination. Its measurement range is comprised between 10 µGy and 10 Gy. U.S. Pat. No. 7,420,187 describes an example embodiment thereof as an individual dosimeter.

Another, more recent technique, is based on radiophotoluminescent materials, in particular barium fluoro-halides doped with europium, of ($BaFBr:Eu^{2+}$) type, used in producing flexible radiographic screens, commonly referred to as "photostimulable phosphor plates" or PSP plates; these screens are also called "photostimulable storage phosphor plates". As such, PSP plates are commonly used, in particular for radiography in the medical field. They are sometimes associated with intensifying screens (see the paper "Evaluation of a computed radiography system for megavolt photon beam dosimetry" by Olch et al, Med Phys 32(9), September 2005, 2987-2999). The signal-to-noise ratio and the detection threshold of a PSP plate imager may be improved by using a stack of several cells individually constituted by "metal sheet/PSP plate" pairs (see, in particular, "Improvement of signal-to-noise and contrast-to-noise ratios in dual-screen computed radiography", by Shaw et al, Med. Phys. 24, 1997, 1293-1302). A cassette adapted to receive such a stack of pairs is described in document WO 2009/030833. The addition of the images, arising from redundancy of the radiographic recording on the different cells, enables the signal-to-noise ratio to be increased in the resulting image. The signal level obtained is roughly proportional to the number n of screens used whereas the noise level is proportional to a square root of that number of screens (cf. "La mesure en détonique; R&D en radiographie éclair AIRIX", by Abraham et al, Chocs journal No. 38 by the CEA-DAM pp 18-28 (2010). However, the application of this technique is complex to implement since PSP plates must be carefully positioned relative to each other, possibly with interleaved screens; they must then be scanned, one after the other; lastly, the images must be spatially re-adjusted relative to each other without error. All these manipulations are long, difficult to automate and lead to high risks of error; this technique is therefore currently used only very occasionally by research laboratories and has not given rise to industrial applications.

Although PSP plates, RPLs and OSLs have in common the implementation of radiophotoluminescent materials, they are differentiated by the material of PSP plates being flexible and able to be manufactured in the form of an ultra-thin layer (typically of the order of 100 µm) which can be deposited or bonded onto a support of some kind, in particular plastic or paper or the like.

None of the existing dosimeters (TLD, OSL, RPL or PSP plate) meets all current needs.

Thus, for photon beams of energy higher than the MeV, reliable quantification of the dose requires them to be placed in electron equilibrium, that is to say in a phantom material of density and thickness perfectly adapted to the energy spectrum of the radiation; the latter must be known, which is not generally the case. Furthermore, their sensitivity threshold is still too high to for the rapid measurement of the dose corresponding to natural environments. Several days of exposure are often required to obtain satisfactory measurements, which can be a very considerable drawback in a crisis situation where radiological contamination is suspected for example; furthermore, this requires multiple operations of intervention in the field to set up the dosimeters to return to read them. The dose limit for the "public" is typically 0.5 µSv/h (80 µSv/month on the basis of 2000 h/year of average operation of the installation. It is thus necessary to operate the installation for several hours to exceed the detection thresholds of a dosimeter in the context of a check, and thus to know whether a normal dose has been exceeded.

Furthermore, obtaining a precise measurement of the quality of the radiation (energy of the particles and dose in Kerma) is difficult. This requires setting up a set of dosimeters juxtaposed against each other or placed one behind the other with different thicknesses of interleaved materials to filter the radiation and attain electron equilibrium. Locating the position of each dosimeter and analyzing the results is painstaking and liable to error when manipulations are carried out (see in particular the paper "Reconstruction of high-energy bremsstrahlung spectra by numerical analysis of depth-dose data" by Otto Sauer et al, Radiotherapy and Oncology, Vol 18, Issue 1, May 1990, pp 39-47, or the paper "Reconstruction of 6 MV photon spectra from measured transmission including maximum energy estimation" by Colin R Baker et al, Phys Med Biol 42, pp 2041-2051 (1997) or the paper "Robust megavoltage X-ray spectra estimation from transmission measurements" by Marian Manciu et al, Journal of X-ray Science and Technology, 17 pp 85-99 (2009)).

As regards PSP plate readers, sophisticated image digitization systems (2D reading of the screens by laser) are commercially available. These systems are all composed of finely adjusted optical and optoelectronic elements enabling the digitization of images of relatively large size relative to those of a PSP plate composing the dosimeter. These systems are thus difficult to transport to be adapted to the field and are oversized and costly if the user merely uses the dosimeters.

SUMMARY

The invention concerns a sensitive charge for a passive dosimeter of which the compact structure makes it easy to use, employing a stack of PSP plates, and of which the detection threshold is very low, less than that of existing dosimeters, without requiring the presence of a phantom material adapted to the ionizing radiation (and thus having a 3D dosimeter function), while being capable of easily discriminating the nature and energy of that radiation and of accessing the determination of its spectrum (and thus having a spectrometer function), while advantageously having dimensions enabling the use of simpler readers than the existing readers.

To that end the invention provides a sensitive charge for a passive dosimeter comprising a plurality of photostimulable flexible screens adapted to be stacked within a dosimeter casing and each comprising a radiosensitive layer of radiophotoluminescent material the reading by illumination of which it is thus possible to defer, those screens being attached to a flexible support having two configurations, namely a folded detection configuration, in which the screens are stacked on each other and an unfolded reading configuration, in which those screens are disposed side by side on the same face of the support.

Preferably, the screens are formed from europium-doped barium fluoro-halide of $BaF(Br,I):Eu^{2+}$ type. However, other radiophotoluminescent materials may be used, in particular but not exclusively, other fluoro-halides of $BaFX:Eu^{2+}$ type, where X is a halogen, such as $BaFBr:Eu^{2+}$, $BaFI:Eu^{2+}$, $BaFCl:Eu^{2+}$, and the like.

As will be discussed later, the screens may be stacked in the dosimeter casing alternately with interleaving sheets with an intensifying and/or absorbent and/or filtering effect (these concepts in practice being very close in meaning).

In detection configuration, the screens are disposed perpendicularly to a radiation to characterize.

Thus, precise positioning of the screens upon each other, in folded configuration, is easily obtained, provided that the screens are precisely positioned on the support, relative to the folds of the support, and that those folds of the support are precisely defined relative to each other. Furthermore, as those screens are attached to the support, their respective thicknesses may be very precisely defined, according to the fastening technique used, for example by deposition; they may also be fastened by bonding. It may be understood that the mounting of the stack in a casing is performed without particular difficulty while ensuring precise relative positioning of the screens; as regards reading, this may be carried out after simply unfolding the support and by successive illumination of each of the screens, for example in a single pass, thus in a simple and fast manner, without risk of error as to the order of the screens read, since on reading, they are still attached to the support.

The principle of dosimeters comprising folded strips is known as such, but in contexts and with dosimetry principles that are very different from those of the invention.

Thus, in the 1950's, U.S. Pat. No. 2,689,307 (Fairbank) proposed a device capable of storing and processing a dosimeter formed from an envelope containing a sensitive layer, a transfer layer and a bag/sachet containing a liquid capable of inducing the transfer of the image formed on the sensitive layer to the transfer layer; the development of the image by transfer involves rupture of a bag containing the liquid, which is carried out by forced passage of the envelope between two members pressed towards each other. The possibility is mentioned of dealing with a plurality of elementary dosimeters carried by the same support folded accordion-fashion. However, this is a very different type of dosimetry to that of the invention, without deferred reading by illumination; moreover, there is nothing to specify that those elementary dosimeters would be printed in superposed configuration, especially as it is provided to separate each individual dosimeter after the forced rupture of its bag of liquid, which means that those dosimeter are considered independently from each other; in particular at the time of reading their respective images (considerably after the forced rupture of the bag of liquid). This document thus neither describes nor suggests a stack of sensitive elements that is subjected to radiation in the stacked condition, with interposition of interleaving sheets, but which may be the subject of deferred reading after unfolding, without rupture at the location of those folds.

Furthermore, U.S. Pat. No. 5,731,589 (Sief et al) describes an UV radiation dosimeter, in which two elements, namely a biofilm and a protective sheet, are superposed. However, this biofilm is folded so as to present two portions having two different roles, of which one is a calibration portion which is sandwiched between the two parts of the protective sheet; it is to be noted that the biofilm is formed from fixed microorganisms. This is thus a different type of dosimetry from that of the invention; whatever the case, this document neither describes nor suggests a stack of sensitive elements which may be the subject of deferred reading after unfolding.

As regards U.S. Pat. No. 6,198,108 (Schweitzer et al), this describes an individual dosimeter badge, formed by folding a strip at three zones separated by fold lines; in operating configuration, an end zone is sandwiched between the other two zones, only that end zone comprising a radio-sensitive element. There is thus no stacking of sensitive elements. This document neither describes nor suggests a stack of sensitive elements which could be the subject of deferred reading after unfolding.

Within a passive dosimeter containing a sensitive charge of the aforementioned type, that is to say formed from a foldable support bearing a plurality of photostimulable screens, interleaving sheets are advantageously interleaved between those screens in folded configuration of the support for those screens, and having as a function to increase the stopping power (absorption function) of the dosimeter with regard to the radiation to measure and thereby to intensify (intensifying function) the signal recorded by the PSP plates. The number of PSP plates and sheets used makes it possible, by absorption of the radiation, to attain and exceed, without prior study, the electron equilibrium in one of the PSP plates and those that follow with high-energy radiation, to finely extrapolate the measured doses to the dose measured in the air or the environment and the effective energy of the incident radiation, and lastly to improve the signal-to-noise ratio of the measurement, and thus the detection threshold, by virtue of merging the recordings (that is to say the images read) of the successive PSP plates. Typically, the dosimeter comprises 5 to 20 photostimulable PSP plates.

It is to be noted that the fact that all the screens are disposed on the same face of the support only leads to a small different in spacing between two successive screens, depending on whether they are face to face (on opposite sides of an interleaving sheet) or back to back, since, in the first case, the spacing merely corresponds to the thickness of the sheet that is sandwiched, whereas, in the second case, the spacing additionally takes into account twice the thickness of the support. This difference may however be disregarded, provided that a support of sufficiently small thickness is chosen.

However, advantageously, this difference in spacing becomes zero if the screens are disposed with two folds between the successive screens, which means that in the stack the screens are all disposed oriented in the same direction.

As regards the interleaving sheets, they may also be attached to the support, for example interleaved with the photostimulable screens, by being formed, like those screens, by deposition or by bonding. In such an alternating case, the screens are separated from each other by two folds, which ensures the same spacing between two successive screens.

As a variant, those interleaving sheets may be formed on the opposite face of the support to that bearing the screens. According to still another variant, they may be independent from the foldable support, while being interleaved between the folds of that support, at the time of exposure to a radiation to characterize; as the case may be, those sheets may themselves be attached to another support, which may or may not be foldable.

The foldable support onto which the screens (and even the interleaving sheets, if they are attached to that support) are fastened may be a straight strip (that is to say of rectangular general shape), with parallel fold lines. As a variant, this support may be a circle arc, with fold lines passing through the center of that circle arc. The support may also be a combination of such shapes.

Whatever the shape of that foldable support, the fold lines are advantageously equidistant. As a variant, those fold lines have spacings which diminish or diminish in regular manner such that the screens are exactly superposed, but having dimensions, between fold lines, that are increasingly short, or on the contrary increasingly long.

In general, the dimension of each plate (screen or interleaving sheet) corresponds to an area of the order of a few cm$^2$. This area may be adapted according to the intended application. It is also possible to use the two-dimensional information of each screen in order to determine the spatial variations in the dose of radiation in the different detection planes and thus within the depth of the dosimeter. It is easily understood that, in this case, the dosimeter becomes a 3D dosimetric imager.

The support is advantageously produced from a material of small thickness and low absorption to enable measurement to cover radiation of low energies, while withstanding successive folding and unfolding. It is to be recalled that photostimulable screens may be reset by illumination, which means that the same stack of screens (and sheets) can be employed for successive utilizations. Paper of high mechanical strength or plastic films are well adapted. The thin radiosensitive layer of the elementary large size PSP plates or photostimulable screens available on the market is conventionally deposited on a plastic support (of polyethylene terephthalate or PET, for example); such a plastic support may be used according to the invention by locally and directly depositing thereon the radiosensitive layers corresponding to the juxtaposed screens, while, if appropriate, advantageously leaving a sufficient space between the successive screens to then place at that location the interleaving (intensifying/absorbent) sheets.

These intensifying/absorbent interleaving sheets may be produced from different radiation absorbing materials, in such a way that their interaction with the radiation is sufficiently high to attenuate it and at the same time create showers of particles which will be easily stopped by the following photostimulable screens (relative to the direction of penetration of the radiation). For X-ray or Gamma dosimetry, of energy greater than of the order of 300 keV, metal materials are advantageously used such as tantalum, copper or lead.

Tantalum, which has a high density, is well adapted to this energy range since it has a high stopping power for a small thickness, and thus without in itself leading to a large thickness for the dosimeter. It can be understood that the thickness of the interleaving sheets in fact depends on the energy range of the radiation to measure. In the case of tantalum, and of monochromatic X-ray radiation of energy less than 10 MeV, the sheets may be of a thickness comprised between 100 and 500 µm. For higher energies, the thicknesses of tantalum may be of several millimeters. By contrast, for energies less than 300 keV, no metal sheet is necessary; in such a case, the interleaving sheets may merely be constituted by the support itself (thus with a very low absorption/intensifying power); in other words, in a sensitive charge, it is possible for there to be no layers other than screens and portions of support.

For the dosimetry of other radiation (neutrons, protons, electrons, and the like), the material of the interleaving sheets may be chosen so as to ensure a calibrated attenuation in relation to the radiation envisioned and to optimize the absorption of the energy of the particles within the thickness of the PSP plates. For the measurement of neutrons, gadolinium-based PSP plates may for example be used (for example available under the reference BAS-NB from Fujifilm®) in combination with interleaving sheets of hydrogenated material or standard PSP plates or gadolinium-based PSP plates associated with sheets of cadmium or gadolinium.

In the case of mixed radiation, the use of two sensitive charges within the same casing, (or even the use of two dosimeters), adapted respectively to different radiation (for example one sensitive charge adapted to X/Gamma radiation and the other adapted to neutrons), or a sensitive charge constituted by a mixing of the two types of screen/sheet pairs, may enable the relative contribution of each type of radiation to be evaluated. To be precise, the various screens of the same sensitive charge, or of a plurality of sensitive charges within a dosimeter, and all the interleaving sheets of that same dosimeter, may be of several types. There may of course be any number of superposed sensitive charges, allotted to the same dosimeter or to several dosimeters, to characterize a radiation.

When thicker sheets appear to be necessary, those sheets may be independent from the support bearing the screens. This enables the PSP plates to be read in commercially available reading apparatuses since the space between the conveying system for the screens and the light guide is typically of the order of 2 mm, which enables easy reading of the screens without having to take into account a possibly greater thickness that the interleaving sheets. By way of example, once folded, the support provided with the various screens has the form of a comb; it may be provided that the interleaving sheets are linked to each other by the same lateral side, also so as also to form a comb; forming the dosimeter then simply involves intermeshing the two combs. Such a configuration enables dosimeters to be formed comprising interleaving sheets having individual thicknesses comprised between a few millimeters and a few centimeters.

The invention also provides a dosimeter comprising at least one sensitive charge of the aforementioned type.

The invention provides a method of reading by illuminating such a sensitive charge, comprising a carrier member for the support in unfolded configuration of the sensitive charge, a source of illumination, and a reading sensor adapted to sense the response of a screen subjected to the action of the illumination source, the carrier member successively bringing the screens attached to the unfolded support into the zone of action of the source of illumination and of the reading sensor.

As indicated above, as the screens are attached to a foldable support, the relative positionings between those screens are known with precision and are in principle always the same; the same applies with the interleaving sheets, especially when those sheets are also carried by the foldable support. There is a relationship that is simple, or in any event known, between the position of a screen in the compact configuration for exposure to a radiation and its position in the unfolded configuration; this makes it possible to easily and unambiguously associate the pixels of the various screens that received the same radiation when exposed. The painstaking manipulations of the known stacks are thereby avoided. Furthermore, reading and resetting by illumination of each PSP plate may be performed in a single pass (or in any case in a small number of passes), without risking modification of the order of the screens relative to the configuration for subjection to the radiation. This results in an improvement in reliability, in reproducibility, in being lasting and in ease of employment.

The spatial re-adjustment of the respective digital recordings of the various successive screens may easily be automated, since the dosimeter, in unfolded position, has a relative configuration of the screens which may be known with precision from that existing in the stacked configuration; furthermore, that geometry is constant from one measurement to another. To facilitate the analysis of the recordings, it is possible to provide marking of an end screen, for example the first screen, in the stack, to be passed through by the radiation; it is then easy afterwards, in reading phase, to immediately identify it (the software may be designed to locate that mark and, if need be, turn the image through 180°). This marking may be obtained by a simple notch in a corner of the screen considered. A software application may automatically and routinely perform the tasks of exploitation and analysis such as the digital stacking (or merging of the recordings), supply a 3D graphical representation of the deposits of energy in all the PSP plates and, consequently, the trace of the curve of energy deposition of the radiation during its progression through the thickness of the dosimeter and the determination of the effective energy or of the spectrum of the radiation, the extrapolation of the energy deposit curve to the dose in the air, the taking into account of the functions of spectral response for the conversion into Kerma in the air, etc.

BRIEF DESCRIPTION OF THE DRAWING

Aims, features and advantages of the invention will appear from the following description, given with reference to the accompanying drawings in which:

FIG. 1 is a diagrammatic view of a sensitive charge for a passive dosimeter in accordance with invention, in flat configuration, FIG. 2 is a view in course of accordion-fashion folding, FIG. 3 is a view in stacked configuration, within a casing to constitute a passive dosimeter, FIG. 4 is a diagrammatic view of another sensitive charge for a passive dosimeter in accordance with invention, in course of being folded accordion-fashion, FIG. 5 is a diagrammatic view of another sensitive charge for a passive dosimeter, in flat configuration, FIG. 6 is a view in course of accordion-fashion folding of the sensitive charge of FIG. 5, FIG. 7 is a perspective view, thereof in stacked configuration in combination with a stack of interleaving sheets, FIG. 8 is a view from above of another sensitive charge for a passive dosimeter, formed as a circle arc.

DETAILED DESCRIPTION

Figure 9:
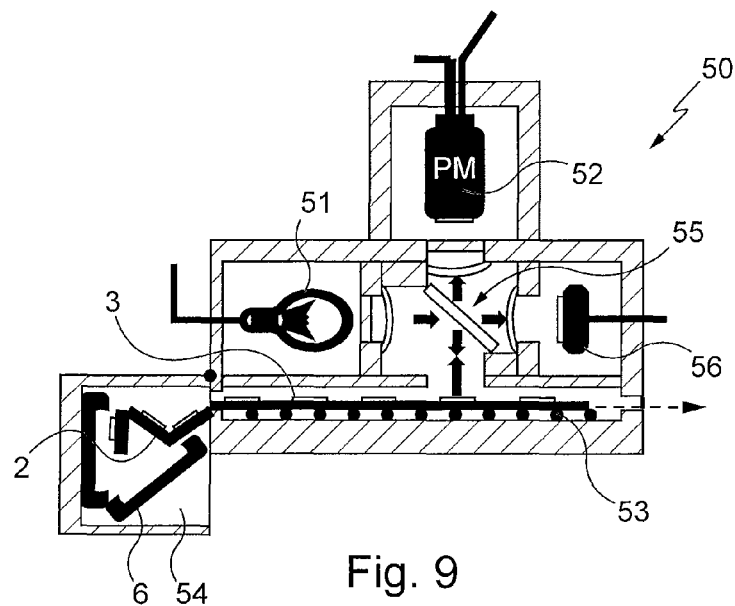
FIG. 9 is a synoptic diagram of a system for reading a sensitive charge in accordance with the example of FIGS. 1 to 7, in particular.

FIGS. 1 to 8 represent various configurations of various examples of sensitive charge for passive dosimetry in accordance with the invention; since a dosimeter essentially comprises such a sensitive charge and a casing containing that charge, such a sensitive charge is commonly called, by simplification, a dosimeter.

FIG. 1 represents a sensitive charge 1 comprising a foldable support 2 bearing on the same face a plurality of photostimulable screens 3 each of which is separated from an adjacent screen by at least one fold line 5. Furthermore, the support 2 bears, on the same face as that bearing the photostimulable screens 3, a plurality of interleaving sheets 4 having an intensifying or absorbent effect for a radiation that the sensitive charge is adapted to measure; these interleaving sheets alternate with the screens, while being separated from each neighboring screen by a fold line 5: it follows that each screen is separated from a neighboring screen by two fold lines 5, and that even each interleaving sheet is separated from a neighboring sheet by two fold lines.

The foldable sheet 2, represented in FIG. 1 in unfolded, flat configuration, has another configuration represented in FIG. 3. The passage from the flat configuration of FIG. 1 to the compact configuration of FIG. 3 corresponds to accordion-fashion folding, that is to say that the direction of folding reverses from one fold line to the next; FIG. 2 represents this support in course of folding; since the screens alternate with the interleaving sheets on the support in flat unfolded inverse (FIG. 1), they also alternate in the stacked configuration of FIG. 3.

It may be noted that, since the screens 3 and respectively the interleaving sheets 4, are separated from the neighboring screens or sheets by two folds 5, all the screens 3 are situated on portions of the support which are all oriented in the same direction (towards the left in FIG. 2) whereas all the interleaving sheets 4 are situated on other portions of the support 2 which are all oriented in the other direction (towards the right in FIG. 2). It follows that the screens are equidistant from each other in the stack of FIG. 3, provided that the support is of constant thickness, which is the case in practice for a support in strip form; in the same way, the interleaving sheets are equidistant from each other in that stack. It also follows that, on folding the support, each interleaving sheet is intimately and directly pressed against the whole surface of the radiosensitive layer of a facing PSP plate.

In FIG. 3, the sensitive charge 1 is placed in a casing indicated diagrammatically by a frame referenced 6, of any appropriate known type, for example in accordance with the teachings of aforementioned document WO-2009/030833. The dosimeter so formed may then be subjected to a radiation, here indicated diagrammatically by an arrow referenced "X".

In the example considered here, the portions of the support 2 on which the screens 3 and the interleaving sheets 4 are fastened are rectangular in shape, with equal dimensions, which ensures precise superposition of the screens and of the interleaving sheets in the stack of FIG. 3, provided that the screens and the sheets have been precisely centered in those portions; it may also be provided for the interleaving sheets to be of larger size than the screens, in length and width, in order to easily ensure proper coverage of the entire surface of the screens in folded configuration; as a variant, it may be provided for the longitudinal dimensions (that is to say parallel to the large dimension of the support, and thus perpendicular to the fold lines 5) to vary in regular manner, either decreasing, or increasing, by a quantity equal to a portion of the following one, which also enables precise superposition of the screens and of the sheets in the stack; it may however be understood that in such a variant, the general shape of the stack would have a trapezoidal construction, and not the shape of a rectangular parallelogram (see Ia FIG. 3).

FIG. 4 represents a variant embodiment without interleaving sheets mounted.

This FIG. 4 represents a sensitive charge 11 comprising a support 12 bearing on the same face a plurality of photostimulable screens 13 each of which is separated from a neighboring screen by at least one fold line 15. As in the preceding example, the screens are in fact separated from the neighboring screens by two fold lines; the various fold lines delimit portions of support which are all of rectangular shape and, as in the preceding example, are of equal size.

In contrast to the sensitive charge of FIGS. 1 to 3, the support 12 bears no interleaving sheet; furthermore, it comprises recesses 17, called windows, centered between each fold line 15; the surface of the windows 17 is slightly below that of the screens 13 so as to maintain a frame to join the screens to the support 12; the support comprises the same number of windows 17 as there are regions delimited by those fold lines; it may consequently be understood that when the sensitive charge 11 is in stacked configuration, a large portion of each screen is separated from a neighboring screen by no thickness support or interleaving sheets. Such a sensitive charge may be analyzed as being formed solely from a stack of screens, which enables detection of radiations of very low energy which could be absorbed too much in the support (typically between a few KeV, by using PSP plates of low absorbency, and around a hundred KeV).

FIGS. 5 to 7 represent a sensitive charge variation referenced 21 in its entirety; the parts of that sensitive charge which correspond to the parts of FIGS. 1 to 3 are designated by reference signs which may be deduced from those of these Figures by the addition of the number 20.

This sensitive charge 21 comprises a foldable support 22 bearing on the same face a plurality of photostimulable screens 23 each of which is separated from a neighboring screen by at least one fold line 25 (folding through 180°), and more specifically by two fold lines 25. This sensitive charge 21 further comprises a plurality of interleaving sheets 24 but, in contrast to the example of FIGS. 1 to 3, those interleaving sheets are independent of the support: more specifically, those sheets are attached to each other so as to form a comb 28 the teeth of which are formed by those interleaving sheets. After folding, so long as no force is applied to it to press the screens against each other, the support 22 also forms a comb schematized under the reference 29, the teeth of which are constituted by the screens and the portions of support bearing them; it is thus possible to intermesh those two combs as is schematized in FIG. 7. The support 22 may, according to need, be used with or without independent interleaving sheets. The fact of making the interleaving sheets independent has in particular the advantage of enabling interleaving sheets to be used of a thickness very much greater than that of the screens.

It may be noted that the support 22 comprises narrow strips 26 alternating with the screens 23 (and the zones without any interleaving sheet); those narrow strips define the spacing of the "teeth" of the comb 29 and thus the maximum thickness of the interleaving sheets. In the stack, the fold lines 25' passing alongside the narrow strips 26 are only folded through 90° (and not through 180°), such that such a narrow strip 26 is, conjointly with those adjacent fold lines 25', the equivalent of a fold line in the sense of FIGS. 1 to 4 (or to a fold line 25 between a screen 23 and a zone without any interleaving sheet).

The comb formed by those independent interleaving sheets may be formed by bonding of those sheets onto a sheet folded accordion-fashion; however, preferably, in particular in case of interleaving sheets of great thickness, those sheets are mounted by edges with the same orientation to a carrier member (represented in dashes in FIG. 7).

FIG. 8 represents another example of a sensitive charge for passive dosimetry in accordance with the invention. In this FIG., the elements that are similar to those of FIGS. 1 to 3 are designated by reference signs which can be deduced from those used on those FIG.s by the addition of the number 30.

This sensitive charge, denoted 31, differs from the sensitive charge 1 of FIGS. 1 to 3 mainly by the fact that the support 32 does not have a straight shape, but a curved shape, with a constant radius of curvature and fold lines 35 which converge towards the center (which in practice is imaginary) of that curved support. As in the case of FIGS. 1 to 3, the support 32 bears a plurality of photostimulable screens 33 on the same face, each of which is separated from a neighboring screen by at least one fold line 35, and more particularly by two such lines, as well as a plurality of interleaving sheets 34 with an intensifying or absorbent effect which alternate with those screens while also being separated from the neighboring interleaving sheets by two fold lines. However, on account of the fact that the support is not rectilinear but in the shape of a circle arc (thus having a single center), the various portions bearing either a screen or an interleaving sheet are not rectangular but have a shape delimited by two concentric circle arcs and two radial lines. However, the screens and the interleaving sheets may, as in the example of FIGS. 1 to 3, be of rectangular shape: thus, after stacking, there is obtained, as in FIG. 3, a precise superposition of the screens and of the interleaving sheets. In fact, it little matters whether the carrier portions of the support are rectangular or not, since that support has no appreciable effect on the performance of the sensitive charge obtained.

Of course, all the comments made with regard to possible variants of this example of FIGS. 1 to 3 also apply for this generally curved configuration of FIG. 8.

FIGS. 9 to 12 represent systems adapted for the reading by illumination of the screens of sensitive charges in accordance with the invention, for example of one of the types described above.

The system 50 of FIG. 9 comprises a source of illumination 51, a sensor 52 adapted to sense the result of the illumination of a screen 3 present in the action zone of the source 51, and a conveyer 53 adapted to carry the foldable support 2 in unfolded configuration and to successively bring the screens, in the order in which they are attached to that support, into that action zone. To the left in that FIG., an unfolding zone 54 is schematized in which there is represented the casing 6 of a dosimeter in accordance with that of FIG. 3 in the open state and from which the sensitive charge that has been subjected to the radiation to characterize is coming out, while unfolding; to the right, an arrow schematizes the exit from the conveyer by which the support leaves with its screens. Reference 55 designates in its entirety an optical system by which passes the illuminating beam and the resulting beam; a control part 56 may be provided for the control of the various components of the system.

Figures 10, 11:
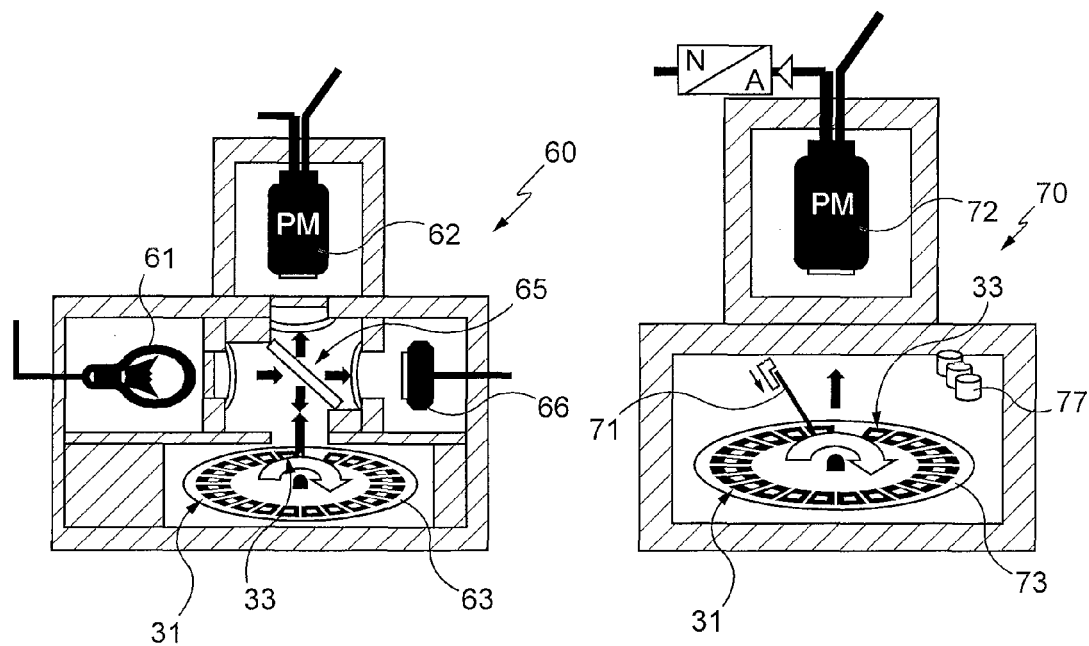
FIG. 10 is a synoptic diagram of another system for reading a sensitive charge in accordance with the example of FIG. 8.
FIG. 11 is a synoptic diagram of another system for reading a sensitive charge in accordance with that example of FIGS. 8.

FIG. 10 represents an analog system, adapted for the reading by illumination of a sensitive charge 31 in accordance with FIG. 8. Parts similar to those of FIG. 9 are designated by reference signs that can be deduced from those of FIG. 9 by addition of the number 10.

This system 60 thus comprises a source of illumination 61, a sensor 62 adapted to sense the result of the illumination of a screen 33 present in the action zone of the source 61, and a bearing part 63 adapted to carry the foldable support 32 in a configuration unfolded into a circle arc and to successively bring the screens 33, in the order in which they are attached to that support, into that action zone. In the example shown, this system also comprises an optical system 65 and a control part 66.

FIG. 11 represents a variant of that system of FIG. 10. Parts similar to those of that FIG. 10 are designated by reference signs that can be deduced from those of that FIG. 10 by addition of the number 10.

This system 70 thus comprises a source of illumination 71, here much more concentrated that in FIGS. 9 and 10, formed from a laser beam emitted from a movable member 71, a plate 73 enabling the rotation of the support 31 and a sensor 72. The rotation of the plate and the mobility of the member 71 (in particular radial) are adapted to bring point by point and successively the entire surface of the screens opposite that laser source. On account of the high concentration of the source of illumination into a point of the beam, the laser successively reads, in the manner of a CD or DVD reading beam, parts only of the screens, but in several passes radially offset from each other, thanks to the mobility of the member 71, which enable different complementary parts of those screens to be read; this enables the sensor, the signal of which is sampled, after a certain number of full turns, to reconstitute complete images from the readings made of those parts.

In this FIG. 11 there is also schematized an source of illumination 77 to reset the PSP plates after their reading.

The spatial re-adjustment of the digital recordings of the signals produced by the PSP plates and thus detected by the sensor may easily be automated, since the sensitive charge is of known and invariable geometry. A software application may obtain therefrom all the exploitation desired to ensure the merging of those recordings and possibly to produce a 3D image of the energy stored in the sensitive charge in the stacked state. In fact, it is within the capability of the person skilled in the art to adapt the known software applications for reading PSP plates to take into account the simple geometrical relationship that the invention ensures between the successive screens.

This software application may consequently deduce therefrom the trace of the deposition curve of the energy of the radiation during its progression through the thickness of the dosimeter and the determination of the energy or of the spectrum of the radiation, the extrapolation of the curve to its dose in the air, the taking into account of the spectral response functions for the conversion of the dose into Kerma in the air, etc.

Figure 12:
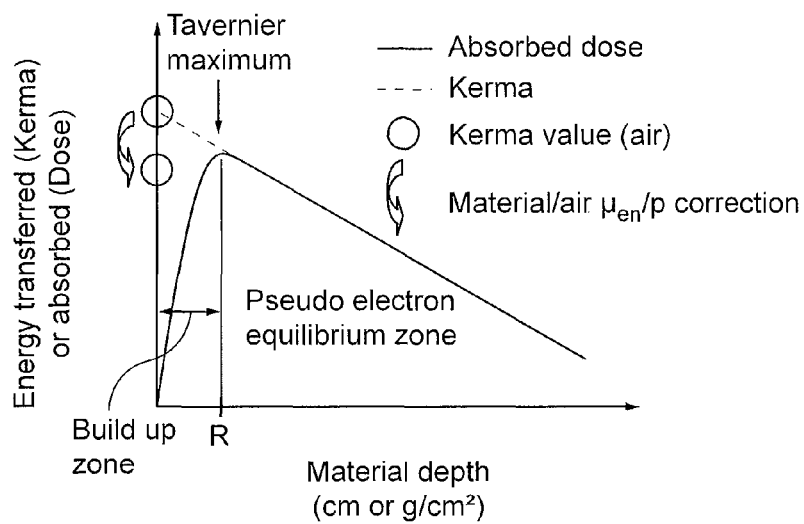
FIG. 12 is a graph showing a typical curve of energy deposit within the thickness of a dosimeter exposed to X-ray radiation or a beam of electrons, correlating the energy transferred (in Kerma) or absorbed (dose) with the depth in the material considered.

As a matter of fact, the information obtained when the automatic analysis is performed gives access to the nature and the energy of the radiation via a comparative analysis of the energy deposition curve with Monte-Carlo simulations or models established beforehand and placed in a database. FIG. 12 presents a typical curve obtained with a high energy photon radiation (>1 MeV). This "spectrometer" function of the dosimeter may possibly be extended to reconstructing the spectrum of the ionizing radiation based on mathematical algorithms presented In the literature (see for example the papers by Sauer et al, by Baker et al, or by Manciu et al, identified above in relation to the PSP plates). The energy deposition curve makes it possible to verify that electron equilibrium was attained when the measurement was made and reveals, in particular in what is referred to as the "build-up" zone, the possible presence of scattered radiation. The consistency of the points of measurement obtained after the Tavernier maximum, which must be aligned on an exponential regression function, enables refinement of the extrapolation to the dose in the air. Lastly, the position of the Tavernier maximum corresponds to the range R of the charged particles having a certain energy of incident radiation, must in practice be consistent with the transmission of the radiation determined in the region of the curve at the electron equilibrium. All of this provides factors ensuring the validity of the measurements obtained and the proper adaptation of the dosimeter to the radiation to measure (according to the nature of its energy).

With the simplified reading devices 50, 60 and 70, there are at least as many reading cycles as there are sensitive charges within a given dosimeter. With a commercially available digitizer dedicated to radiography, several sensitive charges may be read in a single pass.

Figure 13:
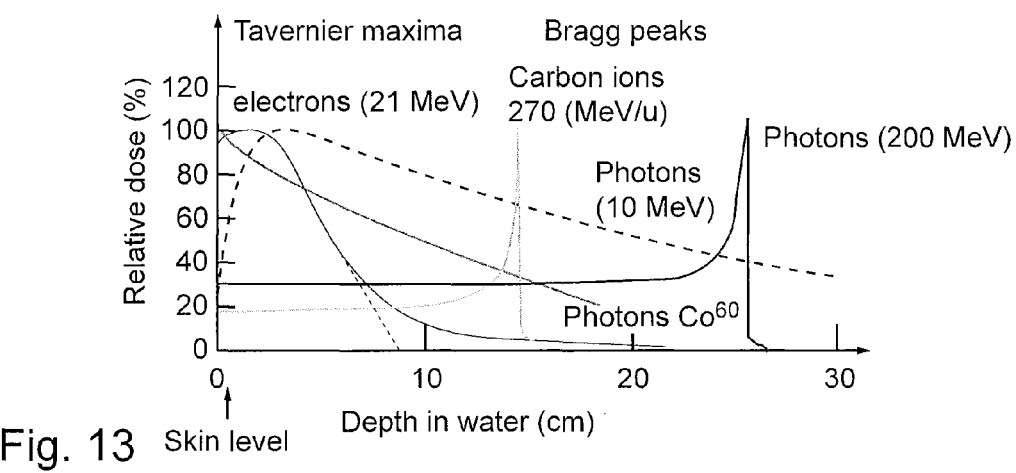
FIG. 13 is a graph showing the typical curves of energy deposit within the thickness of a material according to the nature of the energy of the ionizing radiation.

The content of a dosimeter in accordance with the invention is adaptable to different types of radiation (X, gamma, neutrons, protons, electrons, and the like). Different versions may indeed be constructed for each family of radiation by adapting the PSP plates (number and thicknesses) as well as the nature and the thickness of the interleaving sheets. Such a dosimeter may prove to be particularly useful in external radiotherapy that uses an electron beam, or other ionizing particles (proton therapy, hadron therapy), with the advantage of precisely and automatically determining the position of the Tavernier maximum or of the Bragg peak (see FIG. 13) within the thickness of the tissues and of thereby validating the beam parameters before exposure of the patient.

Figure 14:
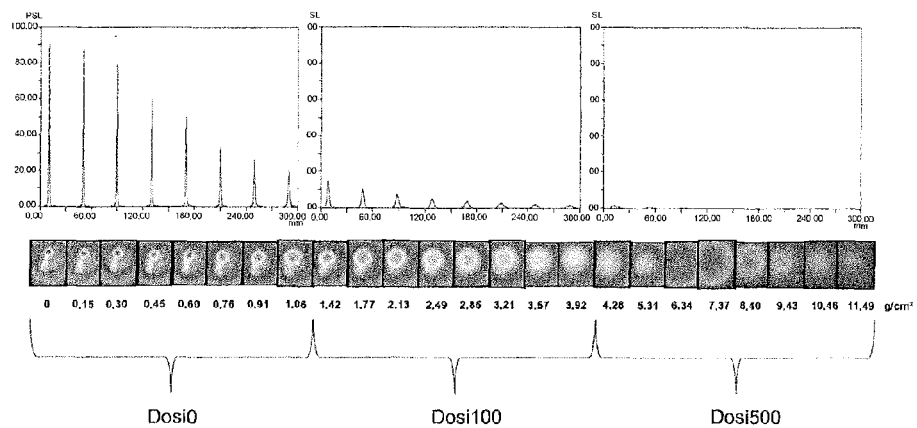
FIG. 14 is a graph showing the images and a horizontal profile read from three sensitive charges, stacked and subjected to a given radiation (here a beam of electrons).

In this context, the dosimetric imager function may enable the geometric characteristics of a narrow beam (position, dimensions, spatial distribution) to be validated and to determine the ballistic future thereof within the thickness. FIG. 14 presents the case of an "imaged" electron beam of 17 MeV with a stack of 3 sensitive charges (or "dosimeters", by simplification) with attached PSP plates: the 1$^{st}$ device without any interleaving sheet (Dosi0), the second with tantalum sheets of 100 μm thickness (Dosi100) and the last with tantalum sheets of 500 μm thickness (Dosi500).

Such a dosimeter has very high sensitivity. It detection threshold, proportional to the number of stacked PSP plates, is less than 0.5 μGy for a stack of 8 PSP plates. It maintains a linear response up to 6 Gy or even beyond (100 Gy according to the aforementioned paper by Olch et al). This dosimeter may thus operate with a linear dynamic for recording that is greater than 7 decades ($10^7$). These properties make it particularly attractive. Thus, it is well-adapted to measurements of low levels of radiation since the exposure times may be reduced by a factor of 5 to 20 relative to the other passive dosimeters. Dosimeters for which reading is practically in real-time or slightly deferred are thus possible for environmental measurements, radioprotection checks, radiodiagnosis checks, etc. Its wide latitude of utilization means that it also adapts to measurements of high dose level, i.e. measurements in a direct stream, which ultimately makes it possible to characterize for example an entire irradiation installation (nuclear power station, radiotherapy laboratory, etc.) and its environment with the same means and the same methodology. Preferably, the reading of the PSP plates exposed with a very high dose with the apparatuses 50, 60, 70 or the commercially available digitizers is carried out by limiting the supply voltage of the sensor or by inserting therein a neutral optical density in front, to avoid dazzling and saturating the sensor.

Lastly, the simplicity of use and the low cost of this (reusable) dosimeter enables the number of points of measurement to be increased to refine the statistical accuracy of the dose measurement, the knowledge of the spatial or spectral distribution of the radiation, or to further reduce the detection threshold.

Exemplary Embodiment of a Dosimeter with Accordion Geometry

By way of example in accordance with the geometry of FIG. 1, sensitive charges for passive dosimetry are constituted by 8 PSP plates and (except for one of them) by 9 slightly larger metal sheets, alternately bonded to the same face of a black Canson 160 g/m² rectangular paper support (dimensions: 34×3×0.22 cm³, weight 1.7 g).

The 8 PSP plates (dimensions: 1.5×2×0.486 cm³, weight=325 mg) are cut out from a screen of MS type commercialized by Fujifilm. The 9 metal sheets (1.25×2.5 cm²) are taken from a tantalum sheet commercialized by Goodfellow; three groups of tantalum sheets are constituted, with thicknesses of 125 μm, 200 μm or 530 μm. A first sensitive charge is cut out from tantalum sheets, and three other sensitive charges are constituted with one of the aforementioned groups of sheets. These sensitive charges each form a dosimeter. These dosimeters are named DosiERLM and are provided as Dosi0, Dosi100, Dosi200 or Dosi500 according to the thickness of tantalum used. They are thus well adapted to the detection of gamma and X-ray radiation and electron beams. The total weight of a dosimeter is comprised between 4.3 g (Dosi0) and 33.5 g (Dosi500).

The paper support is folded "accordion-fashion" so as to place each PSP plate face to face with a metal sheet. The space between the PSP plates is constant in order to obtain proper superposition on folding. The exploitation of the data with the software application is thereby simplified. This assembly thus constitutes a stack of 8 paper/Ta/PSP plate/paper cells ending with a sheet of tantalum (see FIGS. 1 and 2)

The assembly folded in compact position is placed in a plastics casing of small thickness to limit the attenuation of the radiation to measure, which is light-proof to avoid premature erasure of the energy stored during the irradiation in an illuminated zone, and possibly comprising a thickness of foam bonded to the back, on its inside face, to apply a slight pressure intended to press the PSP plates adequately against the metal sheets. The casings used in this example are commercialized by Nintendo to store small games diskettes. The weight of the casing is 8 g. As a variant, several sensitive charges may be installed in the same casing of appropriate thickness.

These dosimeters have been tested in relation to sources of X and gamma radiation. The most important results are provided below.

The dosimeter is exposed to the radiation just as it is, by orienting its "front" face towards the radiation source perpendicularly thereto (that face is clearly identified, both on the dosimeter and the casing).

For multi-energy radiation (of bremsstrahlung type) a compromise must be made as to the nature and thickness of the materials constituting the metal sheets and the support in order for them to be sufficiently "transparent" to the low energy components while maintaining sufficient basis weight to attain electron equilibrium at high energy. In the example considered here, the dosimeter Dosi0 (without metal screens) just as constituted is used for detecting radiation of low energy in the range 50 keV to 1.5 MeV. This energy threshold may be reduced by reducing the thickness and the density of the support or supports under the radiosensitive layer and by cutting out windows from the support (see FIG. 4).

The operating ranges for the other dosimeters in "dosimeter" mode were taken comprised between:

100 KeV and 7 MeV for the Dosi100
200 KeV and 10 MeV for the Dosi200
200 KeV and 20 MeV for the Dosi500

In practice, in "dosimeter" mode, it can be understood that a Dosi0 and a Dosi500 between them cover approximately the entire energy range of photon radiation that can be commonly encountered.

The detailed compositions of the dosimeters produced and tested are given below. The last four lines of the table correspond to the constitution of the "Fujifilm®" PSP plates of the MS type used.

they are 10% after 1 day of latency and 40% after 1 month. In order to enable reading in a commercially available reader, a mask may be produced in a PSP plate of standard size by forming 8 windows therein under which is pressed flat the support for the charge while matching up the 8 windows with the 8 PSP plates. This mask may be used for conveying the dosimeter within a Fujifilm® reader (the latter is equipped with belts or a movable magnetized plate on which the back face of the PSP plates, containing ferrite, is pressed flat. The manual operations carried out between the extraction of the dosimeter from its casing and the introduction within the reader are advantageously carried out under reduced lighting (10 lux recommended) to avoid the premature erasure of the energy stored during the irradiation. The digitization step size is generally set to 100 µm, the latitude to 5, and the sensitivity of the reader to maximum (10 000). The digital image obtained is routinely processed, in a few seconds, with algorithms which may be implemented in Matlab® type environments. A processing example is given below:

1—Conversion of the digital image into luminance intensity of photons received per unit area (PSL/mm$^2$). This conversion is, in general, performed automatically by the scanner. This step may be more elaborate if modes for reducing the sensitivity available on certain apparatuses are used. 2—Subtraction of the inherent noise of the reader and correction of the levels according to the number of digitizations successively carried out with the same dosimeter. When the doses measured are too strong and saturate the measuring apparatus, it is recommended to reduce the sensitivity of the reader

| Layer | Material | Composition by mass (%) | Density (g/cm$^3$) | Thickness (µm) | M.S. (g/cm$^2$) | No. of layers per dosimeter |
|---|---|---|---|---|---|---|
| Front or back face of the casing | PMMA plastic | H: 8.05<br>C: 59.99<br>O: 31.96 | 1.19 | 1080 | 0.1285 | 2 |
| Canson paper 160 g/m$^2$ | Cellulose acetate | H: 6.22<br>C: 44.44<br>O: 49.34 | 0.76 | 220 | 0.0167 | 17 |
| Metal sheet | Tantalum | Ta: 100 | 16.58 | 0.125<br>200<br>ou 530 | 0.<br>0.2073<br>0.3316<br>0.8787 | 0 ou 9 |
| PSP plate protective layer | Terephthalate PET | H: 4.2<br>C: 62.5<br>O: 33.3 | 1.38 | 9 | 0.0012 | 8 |
| PSP plate radiosensitive layer | BaF(Br.l): Eu$^{2+}$ | H: 0.32<br>C: 3.01<br>N: 1.35<br>O: 6.42<br>F: 7.14<br>Br: 25.54<br>I: 4.51<br>Ba: 51.66<br>Eu: 0.05 | 3.4 | 115 | 0.0391 | 8 |
| PSP plate flexible support | Terephthalate PET | H: 4.2<br>C: 62.5<br>O: 33.3 | 1.38 | 202 | 0.0279 | 8 |
| PSP plate ferrite support | Epoxy - ferrite | H: 2.7<br>C: 16.4<br>O: 4.4<br>Fe: 76.5 | 3.01 | 160 | 0.0482 | 8 |

After exposure, the dosimeter is deployed in reading configuration and the 8 PSP plates are scanned in a single pass in a PSP plate reader of BAS 2500 or FLA 7000 (Fujifilm® range) type or any other equivalent reader. If it is desired to avoid any signal losses (fading) induced by natural erasure after the exposure, it is recommended to read the PSP plates in the hours following the exposure. These losses are however very small with the MS type screens at ambient temperature:

(in practice, by reducing the supply voltage of the photomultiplier used in those readers), or even to place a calibrated neutral optical density in front of the photocathode of the photomultiplier. At a high level of dose (typically from 10 mGy to several Grays), a neutral density of the order of 2.6 is used. The exploitation program takes into account this standardized density. If the doses only weakly saturate the reading apparatus, several successive readings may be carried out until a signal level is obtained that is compatible with the dynamic of the reader. As the signal loss arising from the successive readings is reproducible, it suffices to apply a pre-established correction to obtain the true value of the signal that would have been obtained on a first reading without saturation.

3—Automatic recognition of the geometry of the dosimeter and location of the position of each of the PSP plates (which are equidistant).

4—Extraction of the central part of the image of each of the PSP plates in order to avoid edge effects.

5—calculations of the mean and of the standard deviation (SD) of the intensity of the pixels in the central part.

6—Correction of the means calculated at the previous step to take into account defects in spatial homogeneity introduced by the reader and differences in response of the PSP plates (reproducibility): a correction factor corresponds to each PSP plates which was measured in advance by exposing an unfolded dosimeter to a uniform radiation.

7—calculation of the transmission factors for radiations from one cell to the next. A cell is constituted by the "support/Ta/PSP plate/support combination. The transmission factor is obtained by dividing the average intensity measured in the PSP plate (n+1) by the average intensity measured in the PSP plates (n). The PSP plates are numbered in increasing order starting with that facing the radiation source.

8—Calculating the effective average energy of the incident radiation, referred to as "energy equivalent" to obtain the same transmission for monochromatic radiation, by comparison of the transmission factors with a theoretical database tabulating the transmission factors from one cell to the next for the dosimeter used and for different energies of monochromatic radiation. At this step, only the PSP plates Nos. 3 to 7 are exploited in order to ensure that the pseudo electron equilibrium zone is present (moreover, the PSP plates 1, 2 and 8 sometimes suffer from the influence of scattered and back-scattered radiation, which has a low penetration capacity since it is of low energy, in addition to the direct radiation to measure, which renders them inappropriate for the trace of the exponential function of the stream attenuation: see task 10 below). It is also possible to automatically select the PSP plates at electron equilibrium, for example according to the position of the Tavernier maximum when that is present. An example of a formula for calculating the attenuation is given below:

$$Att_{theo\,(i)} = \exp((\mu_{Ta(E)} * X_{Ta}) + (-\mu_{PSPplate(E)} * X_{PSPplate}) + (-\mu_{paper(E)} * X_{paper})) \quad (I)$$

Where $\mu_{TA}$, $\mu_{paper}$, $\mu_{PSPplate}$ (in cm$^3$) are respectively the linear attenuation coefficients of the photons in the tantalum, the paper support and the PSP plate (assimilated as a first approximation to Teflon in this formula). The variable x represents the thickness of the different materials (in cm).

Differences appeared, in particular as from 700 keV, between the analytical model and the Monte-Carlo simulations. They have been principally attributed to the radiation scattered in the cells and the intensifying effect of the tantalum sheets which are not taken into account in the analytical model.

In an energy range less than the MeV, corresponding to the operation of most mobile X-ray generators dedicated to industrial and medical radiography, the match is made relatively easily since the transmission evolves rapidly with the energy of the radiation. Above the MeV, the transmission reaches a "plateau" before decreasing under the effect of the creation of pairs. The "equivalent" energy becomes difficult to determine with precision, in particular with a DosiERLM having a small thickness of tantalum. In this energy range a dosimeter constituted by sheets of tantalum of 5 mm thickness would be better adapted to discriminate the energy of the incident radiation (Dosi5000). For these reasons, the ranges for use in "spectrometer" mode of each dosimeter are advantageously the following:

from 50 keV to 300 keV with the Dosi0
up to 800 keV with the Dosi100
up to 1 MeV with the Dosi200
up to 1.5 MeV with the Dosi500
over 1.5 MeV with the Dosi 5000.

These ranges of use in "spectrometer" mode may be widened to those for the "dosimetry" mode which is more extended towards the high energies, for example by taking into account the position of the Tavernier maximum or, what is more, the entire form of the energy deposition curve for comparison with Monte-Carlo simulations pre-established for typical spectra.

9—Conversion of the PSL/mm$^2$ into "Co$^{60}$ equivalent dose" based on the sensitivity value deduced from the calibration of the dosimeter with Co$^{60}$.

The doses obtained are then automatically represented on a graph according to the basis weight passed through in the dosimeter (in g/cm$^2$). Each point corresponds to a PSP plate. The basis weight passed through increases with the rank of the PSP plate in the stack.

10—Calculation of the exponential regression curve (in accordance with the analytical formula (I) on the points obtained with the PSP plates 3 to 7 and deduction from the point of intersection with the y-axis. The level of this point corresponds to the Co$^{60}$ equivalent dose$_{air}$.

11—Numerical pixel-wise addition (also called numerical stacking or merging), of the eight PSP plate images after correction for the attenuation of the radiation in the cells preceding the PSP plate considered (deduced from the average value of the transmission calculated at -7-).

12—Calculation of the standard deviation of the intensity of the pixels in the image resulting from the merging, then conversion of the PSL/mm$^2$ into "Co$^{60}$ equivalent dose". A value of Co$^{60}$ equivalent dose$_{air}$ is thus obtained after image merging.

13—The spectral response functions of the dosimeters have been calculated with the MCPN code. Following steps -10- and -12-, the doses in Co$^{60}$ equivalent are corrected with those functions to obtain Kermas in the air. The correction is made either by the operator if he has detailed knowledge of the spectrum, or by the program on the basis of the average energy determined at -7-, or more finely by the program if the latter is informed as to the type of continuous spectrum or the energy of the radiation (e.g. monochromatic sources): the data table of the program currently contains various spectral responses for a mono-energy radiation between 50 KeV and 10 MeV or bremsstrahlung radiation between 4 MeV and 20 MeV, as well as bremsstrahlung radiation spectra filtered by objects with a certain mass.

After use, the dosimeter is reset by exposing the radiosensitive face of the PSP plates to an intense white light source: a flash, a strip of neon tubes, one or more halogen lamps, sunlight, etc.

After long storage, it is necessary to reset the dosimeters before using them in order to erase the energy of natural radiation stored over the storage period. At the rate of 1 to 15 µGy/day (according to the site in France), this radiation becomes particularly problematic if the dosimeter has to measure a new exposure close to its detection threshold (0.5 µGy).

The dosimeter will thus have to be reset shortly before its use at low exposure level. This also applies to the mask, if that is constituted with a PSP plate.

Exemplary Embodiment of a Specific Reader

The preceding comments arise from the use of a commercially available reader slightly adapted by means of a mask. In order to avoid acquiring such an advanced and costly two-dimensional reading apparatus, if the operator has no other uses for it, a simpler apparatus dedicated exclusively to dosimetry may be constructed.

By way of example, the reader of FIG. 9 is constituted by the following components: a source of illumination 51 formed by a white lamp (halogen lamp or neon for example) equipped with a 500 nm high-pass filter, a sensor 52 formed from a photomultiplier associated with an interference filter centered on 400 nm, a photodiode 56 for monitoring the source of illumination, an optical system 55 forming a device for transferring the optical signals (lenses, endoscopes, optic fibers or light guides), a frame, a control and recording system, a digital processing unit which may be external, and an electrical supply which may be a battery.

An average intensity value for luminance for each PSP plate is thus directly obtained; Furthermore, the ejection of the strip of PSP plates from the casing may be automated and the system for conveying the PSP plates towards the lamp made rather scant (no need for motors or for micrometric engines as on present readers) since positioning accuracy for a few 1/10ths of a mm is sufficient. This device makes it possible to considerably simplify the reading device, making it easy to transport and of low cost. It is particularly adapted to environmental dosimetric measurements and to operations outside the laboratory (safety, civil, DDE [which is an abbreviation in French for Departmental Infrastructure Authorities], nuclear power stations, uranium mines, and the like).

The lateral conveying of the dosimeter in the apparatus may be replaced by a turntable 63 in the case of a circular PSP plate (this support also folds accordion-fashion)—this is represented in FIG. 10.

If the operator wishes to keep all the functionalities of the invention, and in particular the access to the dosimetric imaging to characterize narrow beams for example, the illumination of the PSP plates by a halogen lamp is advantageously replaced by that of a laser diode of wavelength adapted to the de-excitation of the parts (this correspond to the example of FIG. 11). During reading, this is driven towards the center of the turntable over a latitude covering the height of the PSP plates. The turning of the turntable, at a speed compatible with the duration of de-excitation of the parts, makes possible a concentric scan. Combined with the slow movement of the laser diode, the scan become helical and enables the entire area of the turntable to be covered, in the manner of a CD player. The photons of luminescence liberated are then detected by the photomultiplier associated with an interference filter to be processed conventionally (amplification, sampling and analog/digital conversion). The image is then reconstructed in the form of a matrix to be stored and processed by external or internal computer means. After the scan, one to three halogen lamps enable the dosimeter to be reset rapidly, if a second reading is not required.

The invention claimed is:

1. A sensitive charge for a passive dosimeter comprising:
    a plurality of photostimulable flexible screens stacked within a dosimeter casing and each flexible screen comprising a radiosensitive layer of radiophotoluminescent material,
    wherein reading by illumination can be deferred, and the flexible screens are directly attached to a foldable support having two configurations comprising a folded detection configuration, in which the screens are stacked on each other, and an unfolded reading configuration, in which the screens are disposed side by side on a same face of the flexible support, and
    wherein the flexible screens include two folds between successive screens, such that, in the folded detection configuration, the flexible screens are all oriented in the same direction.

2. The sensitive charge according to claim 1 comprising 5 to 20 photostimulable flexible screens.

3. The sensitive charge according to claim 1, wherein the foldable support onto which the flexible screens are fastened comprises a straight strip of a rectangular general shape with parallel fold lines.

4. The sensitive charge according to claim 1, wherein the foldable support onto which the flexible screens are fastened comprises a circle arc, with fold lines passing through a center of the circle arc.

5. The sensitive charge according to claim 3, wherein the parallel fold lines are equidistant.

6. The sensitive charge according to claim 1, wherein the foldable support comprises one of paper having a high mechanical strength or a plastic film.

7. The sensitive charge according to claim 1, wherein the flexible screens comprises europium-doped barium fluorohalide.

8. The sensitive charge according to claim 1, further comprising intensifying/absorption interleaving sheets that are attached to the foldable support, alternating with the photostimulable screens, the screens being separated by two folds from each other.

9. The sensitive charge according to claim 8, wherein the interleaving sheets comprise a metal material including tantalum, copper or lead, or a material including cadmium, gadolinium or a hydrogenated material.

10. A passive dosimeter comprising at least one sensitive charge according to claim 1, and further comprising interleaving sheets having an intensifying/absorbent effect, and disposed in the folded detection configuration of the foldable support.

11. The passive dosimeter according to claim 10, wherein the interleaving sheets are independent from the foldable support.

12. The passive dosimeter according to claim 11 further comprising a second support, wherein the interleaving sheets are attached to the second support.

13. The passive dosimeter according to claim 12, wherein the interleaving sheets are linked to each other on a same lateral side, so as to form a comb so as to alternatingly mesh with the photostimulable flexible screens.

14. A method for reading by illumination of the sensitive charge according to claim 1, comprising:
    providing a reading device including a carrier member for support of the sensitive charge in an unfolded configuration, an illumination source, and a reading sensor adapted to sense a response of a screen subjected to action of the illumination source,
    the method further comprising activating the carrier member to successively bring the screens attached to the flexible support into a zone of action of the illumination source and the reading sensor.

15. A sensitive charge for a passive dosimeter comprising a plurality of photostimulable flexible screens adapted to be stacked within a dosimeter casing and each comprising a radiosensitive layer of radiophotoluminescent material, wherein reading by illumination can be deferred, the flexible screens attached to a support having two configurations comprising a folded detection configuration, in which the screens are stacked on each other in an accordion-fashion, and an unfolded reading configuration, in which the screens are disposed side by side on a same face of the support.

* * * * *